United States Patent [19]
Betush

[11] Patent Number: 5,097,868
[45] Date of Patent: Mar. 24, 1992

[54] TOGGLE/PUSH-BUTTON PINCH VALVE

[76] Inventor: Frank Betush, 17000 S. Keegan Ave., Carson, Calif. 90746

[21] Appl. No.: 579,978

[22] Filed: Sep. 10, 1990

[51] Int. Cl.⁵ .................. F16K 11/052; F16K 7/06
[52] U.S. Cl. ..................................... 137/595; 251/9
[58] Field of Search ............... 137/595, 607, 636.1, 137/596; 251/9, 10, 263, 251

[56] References Cited

U.S. PATENT DOCUMENTS

| | | | |
|---|---|---|---|
| 3,016,915 | 1/1962 | Moeller | 137/595 |
| 3,450,152 | 6/1969 | Ouellette | 251/9 X |
| 3,463,557 | 8/1969 | Alfieri | 251/251 X |
| 3,635,251 | 1/1972 | Gaines | 251/9 X |
| 3,759,483 | 9/1973 | Baxter | 251/251 X |
| 4,061,142 | 12/1977 | Tuttle | 251/9 X |
| 4,078,583 | 3/1978 | Raghauachari | 251/9 X |
| 4,328,834 | 5/1982 | Oates et al. | 251/9 X |
| 4,328,946 | 5/1982 | Morin | 251/9 |
| 4,359,067 | 11/1982 | Cole | 137/607 X |
| 4,372,345 | 2/1983 | Mehus | 251/9 X |

*Primary Examiner*—Stephen M. Hepperle

[57] ABSTRACT

A pinch valve assembly which includes a pinch lever rotatably mounted in a housing and a head at one end which serves controllably to pinch at least one pressurized fluid carrying tube against a corresponding pinch bar as the lever is turned between two angular positions. In one embodiment a toggle member is pivotally mounted in the housing and has a head positioned to operate the pinch lever between its angular positions, and to cause the pinch lever to snap by an over-center action between its angular position. In a second embodiment, a push-button member is used to operate the pinch lever.

3 Claims, 5 Drawing Sheets

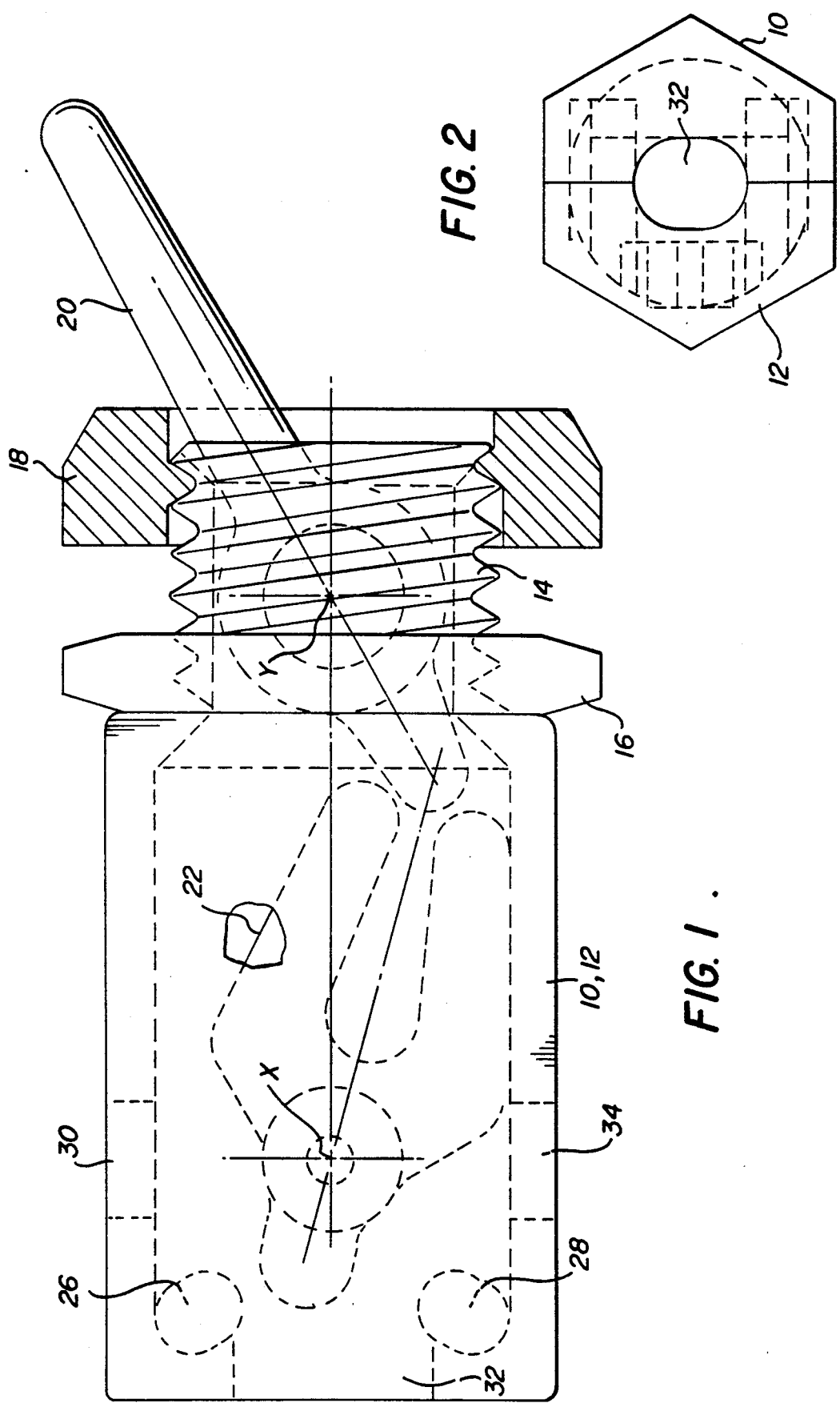

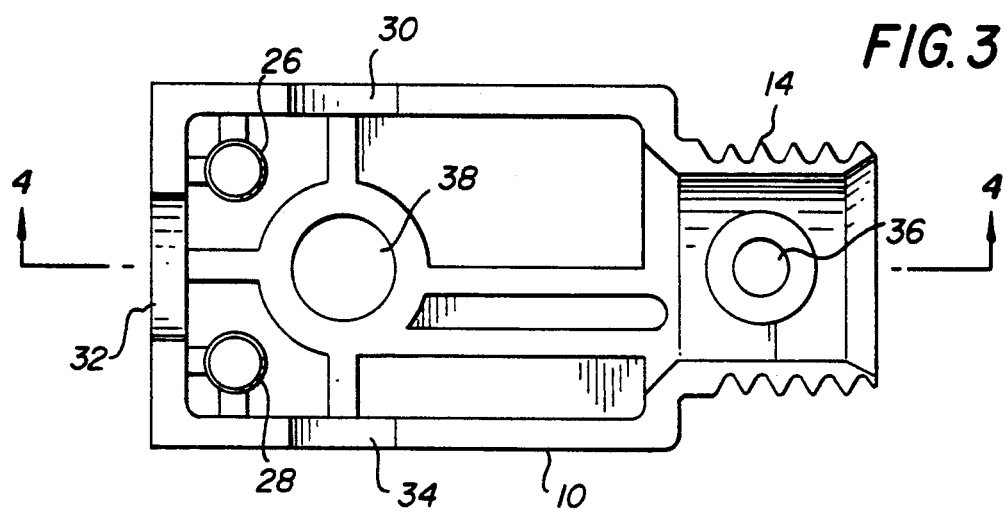
FIG. 3
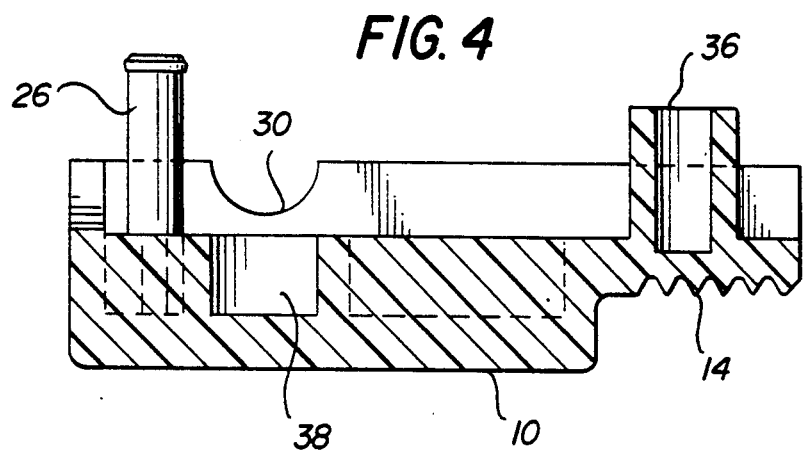
FIG. 4
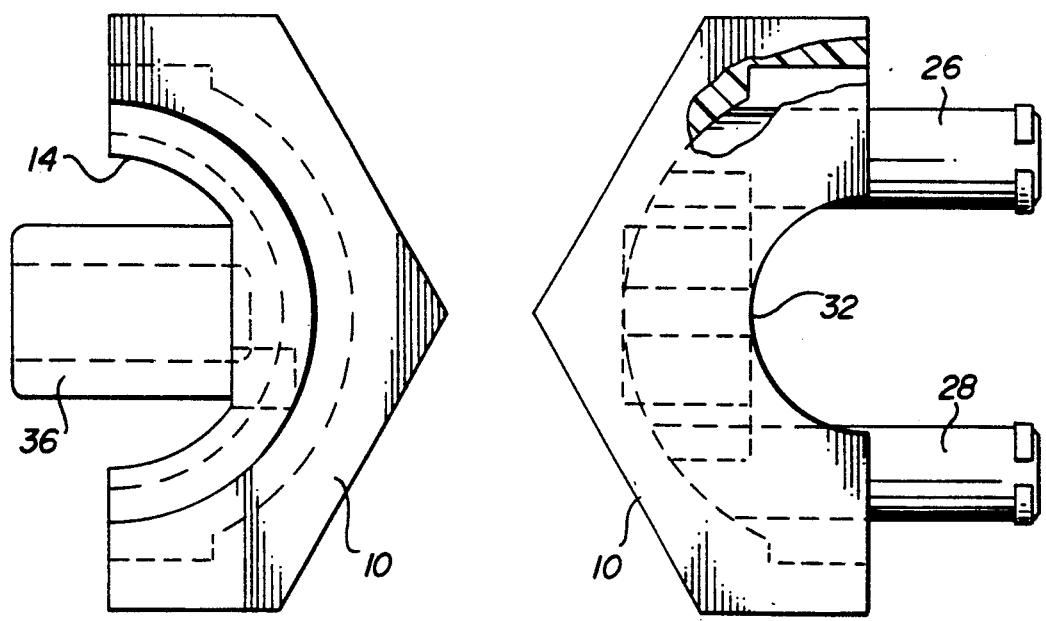
FIG. 5
FIG. 6

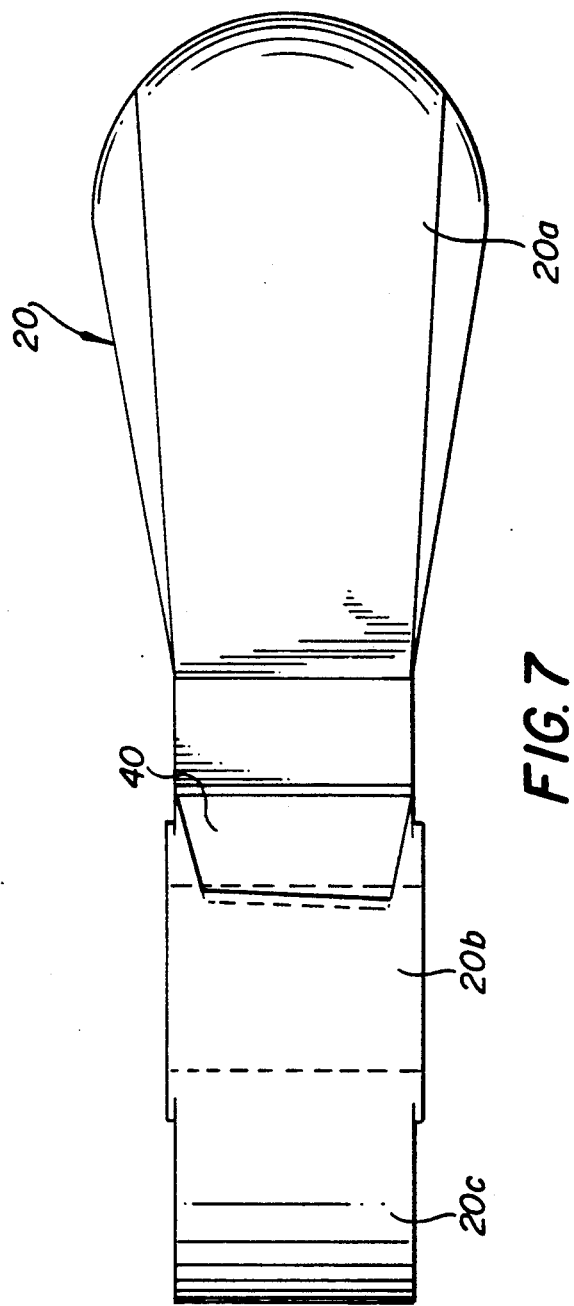
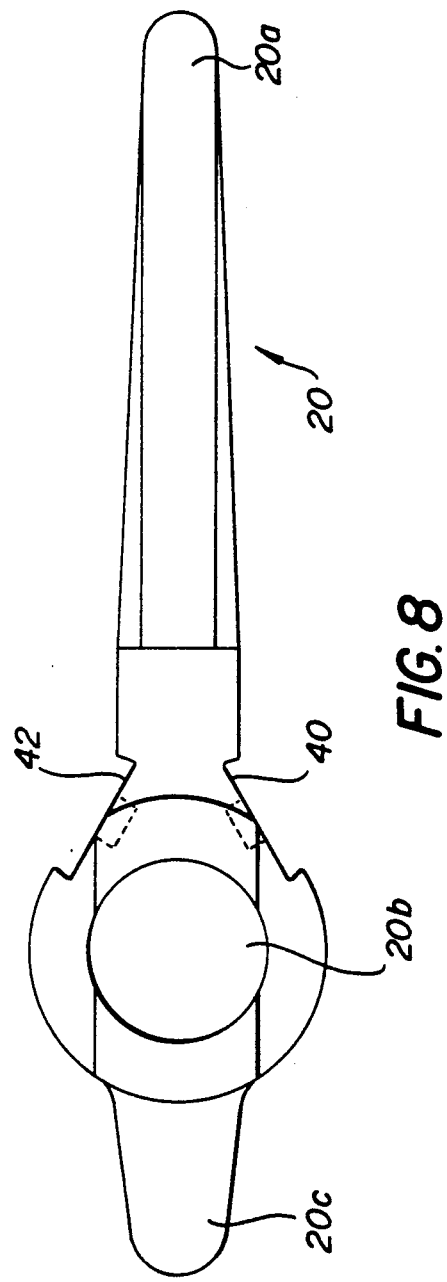
FIG.7
FIG.8

TOGGLE/PUSH-BUTTON PINCH VALVE

BACKGROUND OF THE INVENTION

Toggle operated pinch valves are known. U.S. Pat. No. 3,016,915, for example, discloses a double-acting toggle-operated pinch valve particularly suited for controlling fluid flow through a pair of resilient tubes.

As pointed out in patent, flexible tubing fabricated from resiliently deformable material is widely used to conduct pressurized fluid. In such cases, it is often desirable to provide means to stop fluid flow through one tube quickly and positively, while at the same time to initiate fluid flow through another tube. The fluid flow through both tubes may be controlled by clamps, which is the usual prior art practice. However, such clamps are often relatively slow operating, and it is difficult accurately to relate the stopping of fluid flow in one tube with the initiation of fluid flow in a second tube when clamps are used.

The valve mechanism of U.S. Pat. No. 3,016,915 avoids the use of clamps, but the mechanism disclosed in the Patent is complicated. Accordingly, one objective of the present invention is to provide a pinch valve which may be toggle operated and which is simple in its construction in that it requires relatively few component parts, and yet which is efficient and reliable in its operation.

Push-button operated pinch valves also are known, one such valve being disclosed, for example, U.S. Pat. No. 4,359,067. However, again, the construction of the pinch valve described in U.S. Pat. No. 4,359,067 is somewhat complex. Accordingly, another objective of the present invention is to provide a pinch valve which may be operated either by a toggle lever or by a push-button, and which is simpler in its construction than the prior art pinch valves, and yet is capable of performing operations beyond the scope of the prior art valves.

SUMMARY OF THE INVENTION

A pinch valve assembly is provided which includes a pinch lever rotatably mounted in a housing. The pinch lever has a head at one end which serves alternately to pinch two pressurized fluid carrying tubes against corresponding pinch bars as the lever is turned between two operational angular positions. The other end of the pinch lever is bifurcated. In one embodiment, a toggle member is pivotally mounted in the housing. The toggle member has a handle at one end which extends out from the housing, and it has a head at the other end which extends into the bifurcated end of the pinch lever. Then, as the toggle member is pivotally moved from one operating position to another, it causes the pinch lever to snap by an over-center action to move its head towards one or the other of the pinch bars to perform its pinching function on one or the other the fluid carrying tubes. In a second embodiment, the pivotally mounted toggle member is replaced with a push-button member which is reciprocally and rectilinearly moveable in the housing, and which causes the pinch lever to perform the same function as in the previous embodiment.

BRIEF DESCRIPTION OF THE DRAWINGS

FIG. 1 is a side view, partially in Section, of a pinch valve representing one embodiment of the invention, and which is toggle operated;

FIG. 2 is an end view of the pinch valve of FIG. 1, with certain components removed, taken from the left of FIG. 1;

FIG. 3 is a plan view of half of the housing of the valve of FIG. 1, with the other half removed and on a reduced scale with respect to FIG. 1;

FIG. 4 is a sectional view of the half of the housing shown in FIG. 3, taken along the line 4—4 of FIG. 3;

FIG. 5 is an end view of the half of the housing of FIG. 3 taken to the right of FIG. 3;

FIG. 6 is an end view, partly is section, of the half of the housing of FIG. 3 taken from the left of FIG. 3;

FIG. 7 is a top view of a pivotally mounted toggle member included in the valve of FIG. 1, and on an enlarged scale with respect to FIG. 1;

FIG. 8 is a side view of the pivotally mounted toggle member of FIG. 7;

DETAILED DESCRIPTION OF THE ILLUSTRATED EMBODIMENT

Figure 10:
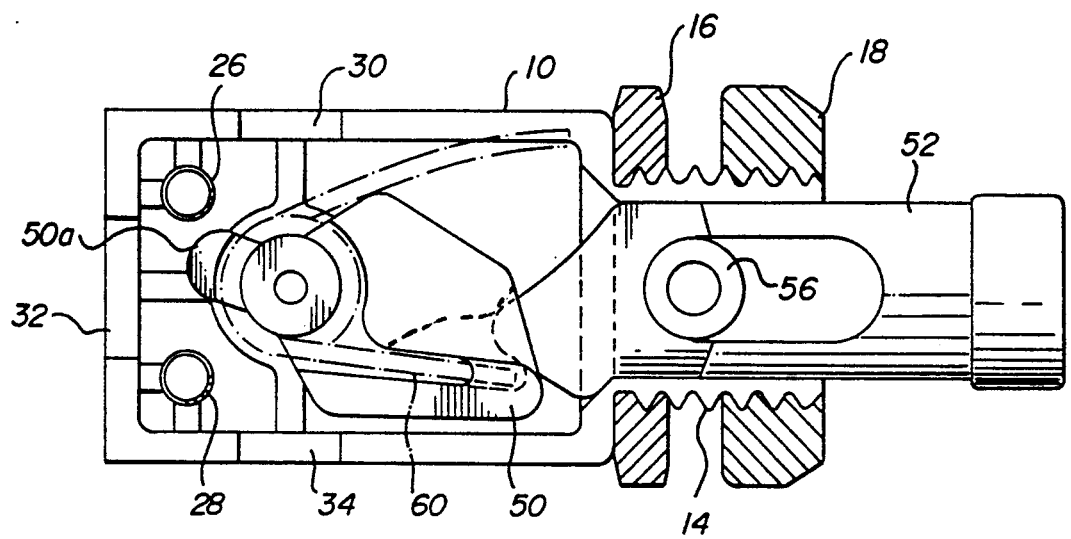
FIG. 10 is a plan view, partly in section, of a valve, similar to the valve of FIG. 1, but operated by a rectilinearly moveable reciprocal push-buttom member, with half of the housing removed to reveal the interior components of the valve.

As shown in FIGS. 1 and 2, for example, the pinch valve of the first embodiment includes a two-piece housing comprising a right half 10 and a left half 12, and having a hexangular shape, as best shown in FIG. 2. A circular threaded neck section 14 is formed at the forward end of the housing 10, 12. A nut 16 is threaded to the neck 14 for mounting the valve on an appropriate supporting panel with the threaded neck section extending through the panel, and with the nut 16 tightened against the forward face of the panel. A knob 18 is mounted on the forward end of the panel. A knob 18 is mounted on the forward end of the threaded neck section 14, as shown.

A toggle member 20 is pivotally mounted in the neck section 14 of the housing. As best shown in FIGS. 7 and 8, the toggle member includes a handle portion 20a which extends outwardly from the housing. The toggle member also includes a bushing 20b which is received on a shaft 36 (FIG. 5) and which is integral with the housing. The toggle member also includes a head portion 20c. The handle 20a of the toggle member is provided with channels 40, 42 in which appropriate indicators, such as "on-off" indicators may be mounted.

Figure 9A:
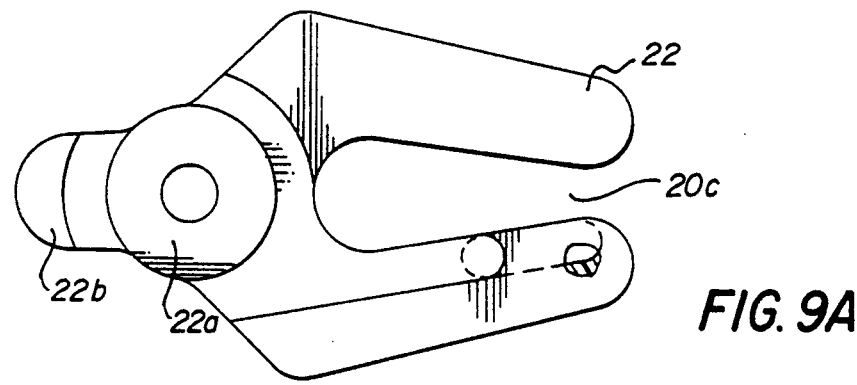
FIG. 9A is a top view of a pinch lever member included in the valve of FIG. 1.
Figure 9B:
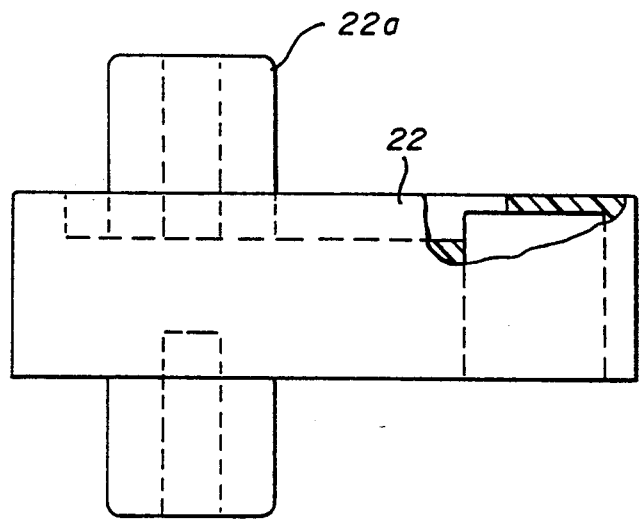
FIG. 9B is a side view of the pinched lever member of FIG. 9A, partly in section.

A pinch lever 22 is pivotally mounted in the housing for pivotal movement about a pivot point X, whereas the toggle member 20 is mounted for pivotal movement about a pivot point Y. The pinch lever 22, as best shown in FIGS. 9A and 9B, includes an elongated head 22b at one end, and it also includes a stub shaft 22a which extends into wells 38 in the two halves of the housing, so that the pinch lever may move pivotally about the pivot point X. The pinch lever 22 has a pair of longitudinally extending arms which are spaced from one another to provide the other end of the pinch lever with a bifurcated configuration, as best shown in FIG. 1. The toggle member 20 has an elongated head 20c which extends into (FIGS. 7A and 7B) the bifurcated end of the pinch lever 22 to operate the pinch lever. The pinch lever has a head 22b which extends between pinch bars 26 and 28, formed in the housing, as best shown in FIGS. 3, 4 and 6.

A first resilient tube may be inserted into the housing through a port 30, as shown in FIGS. 3 and 4, and between the head of the pinch lever 22b of the pinch lever and a pinch bar 26, and out through a port 32 in the end of the housing, as shown in FIGS. 3 and 6. Likewise, a second resilient tube may be inserted through a port 34 (FIG. 3) and between the head 22b of the pinch lever and pinch bar 28, and out through port 32.

As the toggle member 20 is pivotally moved about pivot point Y from one angular position to the other, it engages the pinch lever 22 which, preferably, is formed of a resilient plastic material. Then, by an over-center action the toggle member 20 causes the pinch lever 22 to snap from one operating position to the other. In one operating position, the head 22b of the pinch lever pinches the tube between it and the pinch bar 26; and in the other operating position, the head 22b of the pinch lever pinches the tube between it and pinch bar 28. As best shown in FIG. 4, for example the pinch bars 26 and 28 are formed in the half 14 of the housing, and extend into the other half 12. As mentioned above, the toggle member 20 is pivotally mounted in a boss 36 in the neck section 14 for pivotal movement about pivot point Y, and the pinch lever 22 is pivotally mounted in well 38 (FIG. 4) for pivotal movement about pivot point X.

The second embodiment of the invention is shown in FIGS. 10-13. In the second embodiment, elements which are the same as in the previous embodiment are designated by the same numbers.

Figure 13:
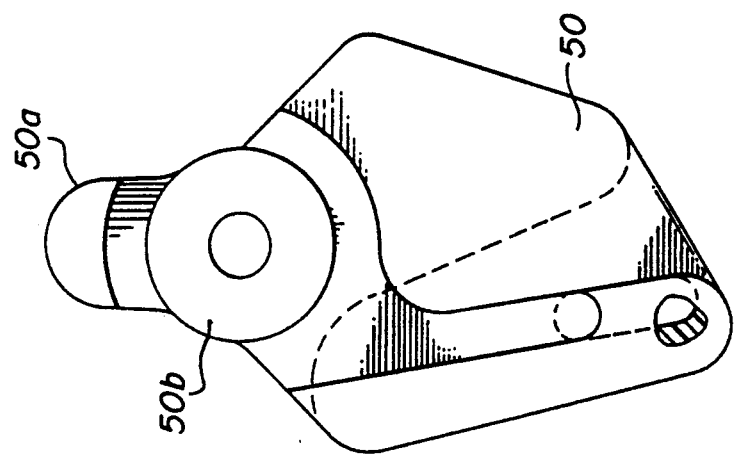
FIG. 13 is a side view of the pinch lever member taken from the left of FIG. 11.
Figure 12:
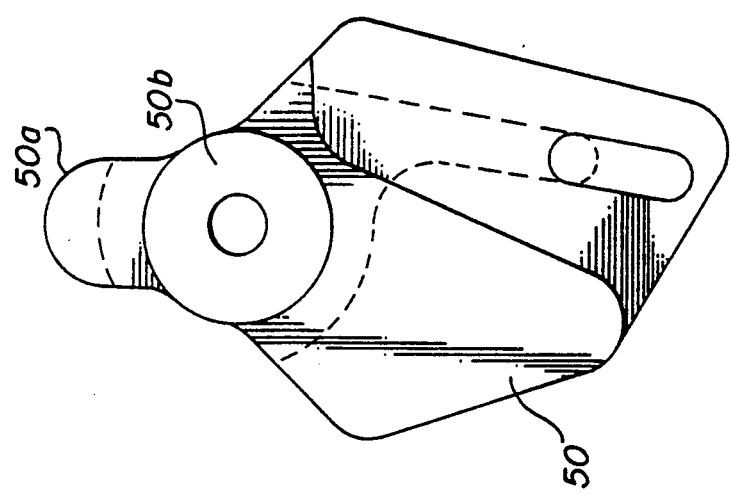
FIG. 12 is a side view of the pinch lever member taken from the right of FIG. 11.
Figure 11:
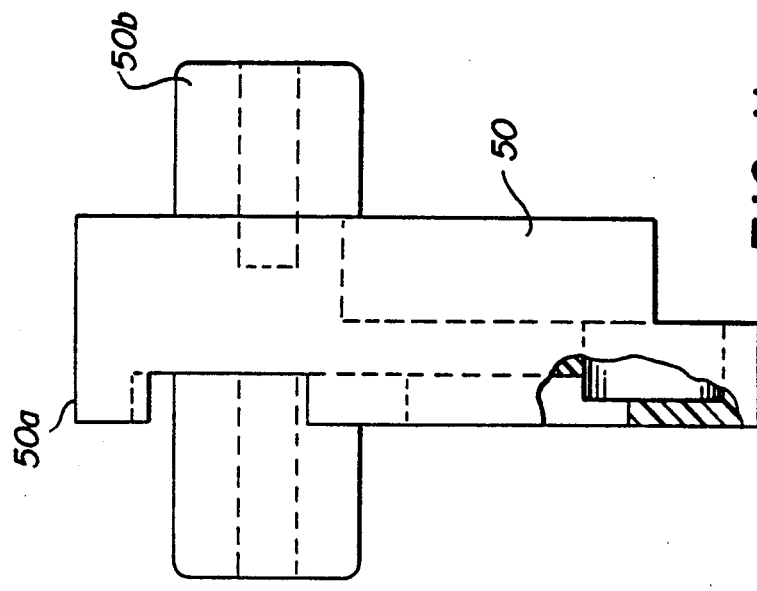
FIG. 11 is a top view, partly in section, of a pinch lever member used in the embodiment of FIG. 10.

The embodiment of FIG. 10, includes a pinch lever 50 which is similar to the pinch lever 22 of the previous embodiment, but which has a somewhat different configuration. Pinch lever 50 includes a head 50a which extends between the pinch bars 26 and 28 and it includes a head 50a which extends between the pinch bars 26 and 28. As in the previous embodiment, a first tube is brought through port 30 between the head 50a and pinch bar 26 and then out through port 32; and a second tube is brought in through port 34 between the pinch bar 28 and head 50a and out through port 32. As best shown in FIGS. 11, 12 and 13, pinch lever 50 includes a stub shaft 50b which is received in wells in the housing, similar to the well 38 of the previous embodiment.

In the embodiment of FIG. 10, a push-button member 52 is slidably mounted in neck 14 of the housing 10, and the push-button may be moved linearly back and forth in the neck section. The travel of the push-button member 52 in the neck section is limited by an upright stud 56 mounted in the neck section. As the push-buttom member 52 is pushed to the left in FIG. 10, it moves into the bifurcated end of pinch lever 50, causing the pinch lever to pivot about its pivot point, so that the head 50a moves into a tube-pinching relationship with pinch bar 26.

A torsion spring 60 is wrapped around pinch lever 50 and around the stub shaft 50b, and this spring serves to bias the pinch lever in a counter clockwise direction in FIG. 10. Accordingly, when the push-button 52 is pressed to the left in FIG. 10, the pinch lever 50 rotates to bring the head 50a into pinching relationship with the tube between it and pinch bar 28. Then, when the push-button is released, torsion spring 60 serves to bias the pinch lever back to the right in FIG. 10 to a position in which head 50a is brought into pinching relationship with the tube between it and pinch bar 28.

It might be pointed out that a similar torsion spring may be used in the embodiment of FIGS. 1-8, 9A, 9B so that when the toggle member 20 is released, the valve returns to its orignal position under the bias force of the torsion spring.

The invention provides, therefore, an improved pinch valve assembly which may either be toggle operated or operated by a push-button. The valve assembly is simple in its construction, and it is easy to operate and to service.

While particular embodiments of the invention have been shown and described, modifications may be made. It is intended in the claims to cover all modifications which come within the true spirit and scope of the invention.

I claim:

1. A pinch valve assembly comprising: a housing; at least one pinch bar mounted in said housing; a first shaft mounted in said housing at a first pivot point; a pinch lever mounted in said housing on said first shaft for pivotal movement about said first pivot point, said pinch lever having an elongated head at one end thereof extending into spaced relationship with said pinch bar for a first angular position of said pinch lever, and said pinch lever having a predetermined bifurcated configuration at its other end; a second shaft mounted in said housing at a second pivot point spaced from said first pivot point; and an actuator mounted in said housing on said second shaft having one end extending into said bifurcated end of said pinch lever to move said pinch lever to a second angular position so as to cause the head thereof to perform a pinching function on a fluid carrying resilient tube interposed between the head of said pinch lever and said pinch bar and which includes a second pinch bar mounted in said housing on the opposite side of said head from set first pinch bar so that movement of said actuator in one direction causes said pinch lever to rotate in a first direction to cause said head to perform a pinching function on the fluid carrying tube interposed between the head and the first-define pinch bar, and movement of the actuator in a second direction causes said pinch lever to rotate in the opposite direction to cause said head to perform a pinching function on a fluid-carrying tube interposed between said head and said second pinch bar and remove the pinching action from said fluid carrying tube between said head and said first pinch bar.

2. A pinch valve assembly comprising: a housing; at least one pinch bar mounted in said housing; a first shaft mounted in said housing at a first pivot point; a pinch lever mounted in said housing on said first shaft for pivotal movement about the first pivot point, said pinch lever having an elongated head at one end thereof extending into space relationship with said pinch bar for a first angular position of said pinch lever, and said pinch lever having a predetermined bifurcated configuration at its other end; a second shaft mounted in said housing at a second pivot point spaced from said first pivot point; and an actuator mounted in said housing on said second shaft having one end extending into the said bifurcated end of said pinch lever to move said pinch lever to a second angular position so as to cause the head thereof to perform a pinching function on a fluid carrying resilient tube interposed between the head of said pinch lever and said pinch bar, in which said actuator is a toggle member pivotally mounted on said second shaft in said housing to cause said pinch lever to move from one of said angular positions to the other by an over-center snap action.

3. A pinch valve assembly comprising: a housing; at least one pinch bar mounted in said housing; a first shaft mounted in said housing at a first pivot point; a pinch lever mounted in said housing on said first shaft for pivotal movement about said first pivot point, said pinch lever having an elongated head at one end thereof extending into spaced relationship with said pinch bar for a first angular position of said pinch lever, and said pinch lever having a predetermined bifurcated configuration at its other end; a second shaft mounted in said housing at a second pivot point spaced from said first pivot point; and an actuator mounted in said housing on said second shaft having one end extending into said bifurcated end of said pinch lever to move said pinch lever to a second angular position so as to cause the head thereof to perform a pinching function on a fluid carrying resilient tube interposed between the head of said pinch lever and said pinch bar, in which said actuator is a push-button member slidably mounted on said second shaft in said housing for reciprocal sliding movement with respect thereto, in which the bifurcated end of said pinch lever is configured to cause said pinch lever to move to said second angular position when the end of said actuator extends into the bifurcated end of said pinch lever.

* * * * *